Oct. 23, 1923.
G. GÜNTHER
COMBINED CLOCK AND LETTER BALANCE
Filed Nov. 28, 1922
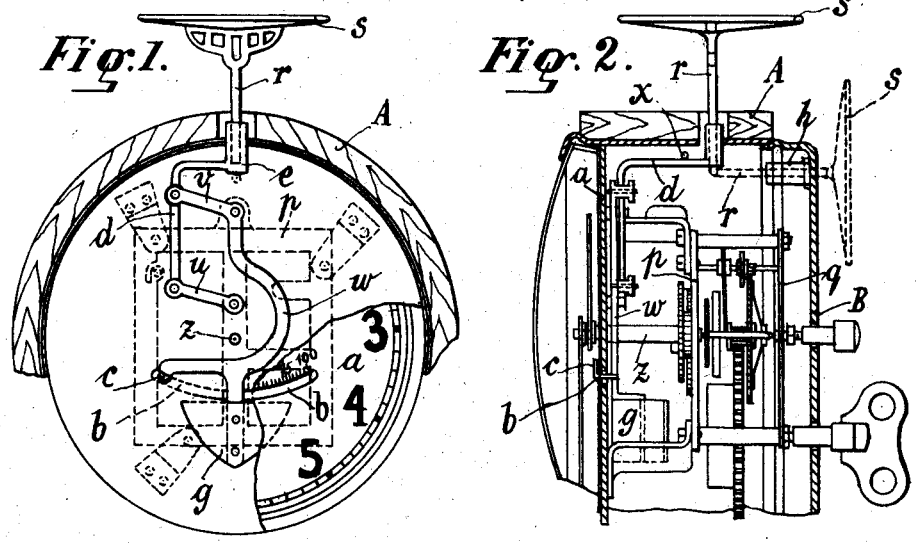
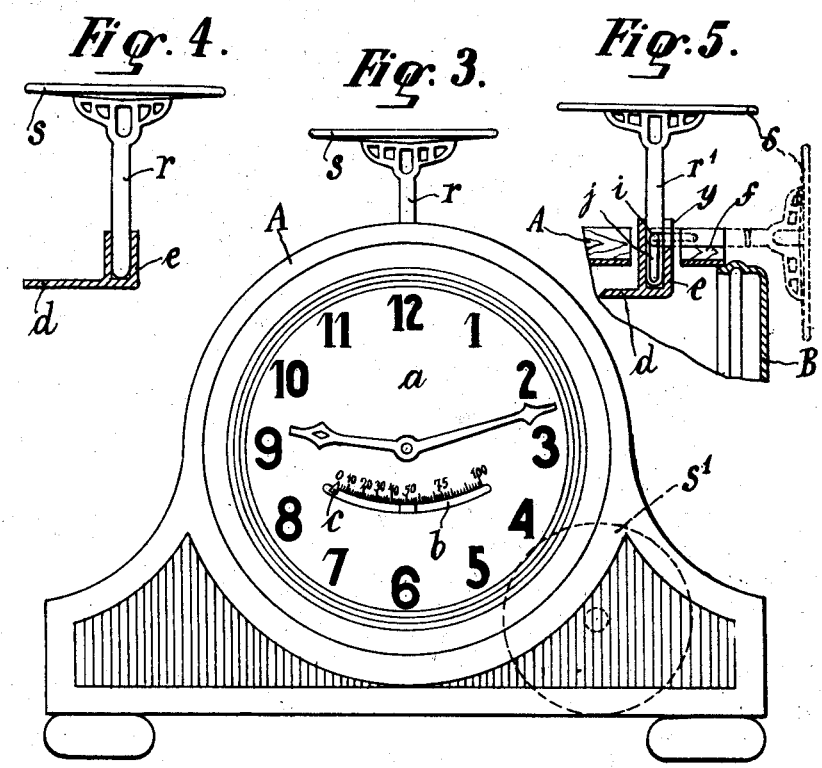
Inventor
Gottfried Günther
by
Attorney Patented Oct. 23, 1923.

1,471,956

UNITED STATES PATENT OFFICE.

GOTTFRIED GÜNTHER, OF SCHWENNINGEN-ON-THE-NECKAR, GERMANY.

COMBINED CLOCK AND LETTER BALANCE.

Application filed November 28, 1922. Serial No. 603,844.

*To all whom it may concern:*

Be it known that I, GOTTFRIED GÜNTHER, a citizen of the German Republic, and resident of Schwenningen-on-the-Neckar, Germany, have invented a new and useful Combined Clock and Letter Balance, for which has been filed an application in Germany, dated March 8th, 1922, and of which the following is a specification.

This invention relates to the combination, of a clock with a letter-balance in such a manner that the casing of the clock encloses also the weighing mechanism and the dial of the clock has a scale with a slot through which a small hand co-operating with the scale projects. The scale pan, or the letter-support respectively, is located above the clock-casing, and the weighing-mechanism is arranged between the clock-work and the dial so that the otherwise empty space around the hand shafts is utilized.

The arrangement may be such that the scale pan and its carrier or support may either be removed from the casing or may be rearwardly slewed so as to be out of the way when the letter-balance is not used. Besides, the weighing mechanism may be prevented from swinging during that time, or may be locked respectively, which may be effected, for instance, by the slewable, i. e. slewed, scale pan support, as is fully described hereinafter.

My invention is illustrated, by way of example, in the accompanying drawing, in which Figure 1 is a front view of the combined clock and letter-balance, the foot of the clock and the greatest portion of the dial being removed and chiefly the weighing mechanism being shown in front view. Figure 2 is a vertical section through the clockwork, the lowest portion of the casing, inclusive the foot, being broken away. Figure 3 is a front view of the complete clock, ready for weighing, and Figures 4 and 5 show some details which also are fully treated hereinafter.

The clock is generally a clock with a base plate, maybe with feet, which is to stand on a horizontal surface, and its casing is correspondingly shaped. The clock-work is located and supported in known manner between the front wall or plate $p$ and the rear wall or plate $q$, and in front of the wall or plate $p$ is the dial $a$ which has a curved slot $b$ through which projects the pointed end of the hand $c$ that co-operates with a scale extending along the slot and showing the weights. In front of the whole is a glass-plate, as shown in Figure 2.

The weighing mechanism is arranged between the clock-work plate $p$ and the dial $a$, and above the casing of the clock is the weighing pan $s$ which is secured to a standard or stem $r$. This is inserted into a sleeve $e$ forming the upper end of a vertically movable angular member $d$ supported and guided by a lower link $u$ and by an upper link $v$ forming an arm of a kind of bell-crank lever the other arm $w$ of which is curved (Figure 1) and extends around the shafts of the clock-hands. The lower end of the arm $w$ forms the indicating hand $c$ co-operating with the scale at the slot $b$, and a downwardly extending lug of the arm $w$ has attached to it a poise $g$ which is deviated to the right when the pan $s$ is loaded. Owing to the upper portion of the lever arm $w$ being curved, it is prevented from contacting with the hand shafts of the clock.

The weighing mechanism shown in the drawing is merely an example. It is obvious that an equivalent one may be arranged in the space provided for its reception, and it is also obvious that a weighing mechanism having a spring instead of a poise may be employed.

$x$, Figure 2, is an abutment or stop which co-operates with the horizontal portion of the member $d$ of the weighing mechanism and is so located with respect to it that the indicating hand $c$ points just to zero.

If the weighing mechanism need not be employed, the standard or stem $r$ with the pan $s$ may be taken off the clock, i. e. drawn out of the sleeve $e$, or the arrangement may be such that the stem with the pan may be rearwardly slewed, as shown in Figure 5, and described hereinafter. It is also desirable to prevent the weighing mechanism from oscillating when not being used, and for that purpose I have provided in the form of construction shown in Figures 1 and 2 a horizontal sleeve $h$ at the inner surface of the rear wall of the casing of the clock. This sleeve is intended to receive the stem $f$ of the pan after these parts have been taken off the sleeve $e$, the length of the stem being such that its end comes to lie just below the sleeve $e$ whereby the weighing mechanism is locked. At the same time the weighing pan s is out of the way, it being preserved behind the casing in that position indicated by dotted lines in Figure 2. I wish it, however, to be understood, that also another place may be chosen to hold the pan when out of use, for instance that place indicated by the dotted circle at the right of Figure 3. There is then provided any suitable intermediate member acted on by the stem of the pan and acting in its turn for instance upon the poise so as to check the weighing mechanism, or prevent it from unnecessary oscillations respectively.

Referring now to Figure 5, the lower end of the stem $r^1$ of the pan s has a vertical slot $j$ through which extends a horizontal pin $i$ affixed in the sleeve $e$. The stem may, thus, be lifted as far as permitted by the length of the slot. The sleeve has a recess $y$ at its rear edge, and the lifted stem may be rearwardly turned upon the pin $i$ and slewed down into that recess, when it assumes the position shown in dotted lines in Figure 5. There may be provided behind the sleeve a special supporting member $f$ for the stem, and an elastic means may be provided holding the stem fast in its horizontal position. It is, finally, obvious that the horizontally slewed stem (Fig. 5) forms at the same time a checking means for the sleeve and, thus, for the whole weighing mechanism which cannot make unwished-for oscillations.

I claim:

1. A combined clock and letter-balance, comprising, in combination; a clock-casing; a weighing mechanism arranged between the clock-work and the dial, and having its upper end located at the top of said casing; a weighing pan arranged above the clock casing and being supported by said upper end of the weighing mechanism; the clock dial having a scale executed corresponding to the purpose of the said weighing mechanism, as well as a curved slot extending along said scale; and an indicating hand projecting forth through said slot from a lower member of the weighing mechanism and being adapted to co-operate with said scale.

2. A combined clock and letter-balance, comprising, in combination; a clock-casing; a weighing mechanism arranged between the clock-work and the dial, and having its upper end located at the top of said casing; a weighing pan and a supporting stem detachably attached to said upper end of the weighing mechanism; means to support said stem with the pan when this is out of use; the clock dial having a scale executed corresponding to the purpose of the said weighing mechanism, as well as a curved slot extending along said scale; and an indicating hand projecting forth through said slot from a lower member of the weighing mechanism and adapted to co-operate with said scale.

3. A combined clock and letter-balance, comprising, in combination, a clock-casing; a weighing mechanism arranged between the clock-work and the dial and having its upper end located at the top of said casing; a weighing pan and a supporting stem detachably attached to said upper end of the weighing mechanism; means to support said stem with the pan when this is out of use, said means being of such a kind and so arranged that the inserted pan stem is adapted to lock the weighing mechanism; the clock dial having a scale executed corresponding to the purpose of the said weighing mechanism, as well as a curved slot extending along said scale; and an indicating hand projecting forth through said slot from a lower member of the weighing mechanism and being adapted to co-operate with said scale.

In testimony whereof I affix my signature in presence of two witnesses.

GOTTFRIED GÜNTHER.

Witnesses:
 EUGEN SCHREIBER,
 ANTON FRYE.